United States Patent
Malin et al.

(10) Patent No.: US 9,338,501 B2
(45) Date of Patent: May 10, 2016

(54) SYSTEM AND METHOD TO REMOTELY PROGRAM A RECEIVING DEVICE

(71) Applicant: Sling Media, Inc., Foster City, CA (US)

(72) Inventors: David Malin, Great Neck, NY (US); Robert Sosinski, North Bergen, NJ (US)

(73) Assignee: SLING MEDIA, INC., Foster City, CA (US)

( * ) Notice: Subject to any disclaimer, the term of this patent is extended or adjusted under 35 U.S.C. 154(b) by 184 days.

(21) Appl. No.: 14/173,655

(22) Filed: Feb. 5, 2014

(65) Prior Publication Data
US 2014/0157341 A1 Jun. 5, 2014

Related U.S. Application Data (62) Division of application No. 13/088,269, filed on Apr. 15, 2011, now Pat. No. 8,676,034.

(51) Int. Cl.

| | |
|---|---|
| *H04N 5/76* | (2006.01) |
| *H04N 9/80* | (2006.01) |
| *H04N 7/173* | (2011.01) |
| *H04N 7/16* | (2011.01) |
| *H04N 21/433* | (2011.01) |
| *H04N 5/765* | (2006.01) |
| *H04N 21/2747* | (2011.01) |
| *H04N 21/472* | (2011.01) |
| *H04N 21/658* | (2011.01) |
| *H04N 9/79* | (2006.01) |
| *H04N 21/2665* | (2011.01) |
| *H04N 21/41* | (2011.01) |

(52) U.S. Cl.
CPC ........... *H04N 21/4334* (2013.01); *H04N 5/765* (2013.01); *H04N 9/79* (2013.01); *H04N 21/2665* (2013.01); *H04N 21/2747* (2013.01); *H04N 21/4135* (2013.01); *H04N 21/47214* (2013.01); *H04N 21/6581* (2013.01)

(58) Field of Classification Search
USPC .................................. 386/239–248, 291–299
See application file for complete search history.

(56) References Cited

U.S. PATENT DOCUMENTS

| | | |
|---|---|---|
| 2001/0056404 A1 | 12/2001 | Kuriya et al. |
| 2004/0107170 A1 | 6/2004 | Labrou et al. |
| 2005/0128351 A1 | 6/2005 | Yamamoto et al. |
| 2008/0170836 A1 | 7/2008 | Kinoshita et al. |
| 2009/0119701 A1 | 5/2009 | Aldrey et al. |
| 2009/0210876 A1 | 8/2009 | Shen et al. |

*Primary Examiner* — Hung Dang
(74) *Attorney, Agent, or Firm* — Seed IP Law Group PLLC (57) ABSTRACT

A web server presents a web page to a user. The web page dynamically presents information corresponding to a digital video recorder (DVR) associated with the user. The web server accepts input information to control the DVR. A delayed-job server accepts input from the web server and stores a job entry corresponding to the input in a message queue. The delayed-job server processes the job entry from the message queue and creates a function request representative of the web server input. An access server accepts the function request from the delayed-job server and bi-directionally communicates messages with the DVR. The access server communicates a response to the function request back to the delayed-job server. The delayed-job server communicates data from the response to the web server, wherein the web server is not blocked while waiting for the response from the delayed-job server.

20 Claims, 7 Drawing Sheets

SYSTEM AND METHOD TO REMOTELY PROGRAM A RECEIVING DEVICE

CROSS-REFERENCE TO RELATED APPLICATION

This application is a divisional application of U.S. patent application Ser. No. 13/088,269, filed Apr. 15, 2011, which is hereby incorporated by reference in its entirety.

BACKGROUND

1. Technical Field

This disclosure generally relates to computing servers that communicate control information to receiving devices, such as set top boxes, and more particularly to accepting a user request input via a host web page and passing the user's request to a receiving device associated with the user.

2. Description of the Related Art

Audio/video/control/data content is delivered to homes, businesses, and other locations by satellite, cable, over the air broadcasts, and in other ways. The programming includes television shows, movies, live broadcasting, music, interactive data (e.g., web pages), and the like. Often, audio/video/control/data content is communicated as one or more encoded data streams that are passed through a receiving device such as a set top box. The set top box then delivers the audio/video/control/data content to one or more presentation devices such as display screens (e.g., television monitors) and stereos.

Many set top boxes have digital video recorders (DVR). A DVR can be operated to record audio/video/control/data content that is received by the set top box. The DVR can record the content immediately at the command of a user. Alternatively, the DVR can record audio/video/control/data content at a determined time that is programmed by a user. A user can program parameters related to the DVR recording via a user interface integrated in the set top box. The parameters generally include information related to the programming channel and appropriate time to enable the DVR to begin and end the recording.

In such cases, the user may be able to program the DVR by directly manipulating user interface controls on the set top box. For example, the set top box may have particular buttons or a touch screen along with a display to provide feedback to the user. Alternatively, a handheld remote control device may be used to provide the programming input to control the DVR. The remote control is in the same room as the DVR and communicates via an infrared, laser, or other optical link, or alternatively, via a low power RF signal. In such cases, the DVR can be programmed from a close proximity, but the DVR cannot be programmed from a remote location.

BRIEF SUMMARY

A remote programming system can be used to remotely program a digital video recorder (DVR) of a receiving device. In one embodiment, a user who is not at home is able to remotely program the receiving device that is at his home using a computing device (e.g., a computer that can access the Internet).

According to an embodiment, a computing server system includes a web server configured to present a web page to a user. The web page is dynamically generated to present information corresponding to a digital video recorder associated with the user, and the web server is configured to accept input information from the user to control the digital video recorder.

The computing server system includes a delayed-job server configured to accept web server input and store a job entry corresponding to the web server input in a message queue. In some embodiments, the delayed-job server is a configured message server/queue and a messaging bus system. The message server/queue and messaging bus can be implemented on a computing server that performs other tasks.

The delayed-job server (e.g., the message server/queue and messaging bus) is configured to process the job entry from the message queue and create a function request representative of the web server input. The delayed-job server is configured to receive a response to the function request and communicate data from the function request response to the web server. The web server is not blocked while waiting for the function request response from the delayed-job server. When the delayed-job server receives a response from the mechanism that interacts with the receiving device or when a configurable time-out occurs, the delayed-job server provides a response to the web-server.

The computing server system includes an access server configured to accept the function request from the delayed-job server and bi-directionally communicate messages with the digital video recorder. The access server is configured to communicate a function request response to the delayed-job server.

According to another embodiment, a computing server performs actions on receiving devices. The actions include accepting, via a user portal, information corresponding to a user account. The actions include identifying a receiving device based on the user account information. The actions include accepting an input request to perform a function on a receiving device wherein the input request communicated from a user portal and correlating the input request with a user account. A management process and a plurality of worker threads are executed. The actions of the computing server further include storing a job entry in a first repository, the storing performed by the management process, the job entry corresponding to the input request. The job entry can be retrieved with one of the plurality of worker threads.

The actions of the computing server further include generating a function request corresponding to the job entry and communicating the function request to logic associated with the receiving device. The logic can be a delayed-job server. A response corresponding to the function request may be received from the logic, and a record associated with the response can be stored in a second repository. The record may be provided to a user via the user portal.

According to one more embodiment, a computer-readable medium has a program to perform actions on receiving devices. The program accepts an input request directed to a receiving device from a web server. The program identifies the receiving device based on user information in the input request. A job entry corresponding to the input request is stored in a message queue (e.g., a delayed job instance), and a function request corresponding to the job entry is generated. The function request is communicated to a receiving device system, and the receiving device system is configured to solicit operational information from the receiving device. The receiving device system is also configured to program the receiving device to perform digital video recording functions. A response is received from the receiving device system, a record associated with the response is stored, and the record is provided to the web server.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

It may desirable for a user to program a digital video recorder (DVR), from a remote location. For example, according to various embodiments, an employee working late is able to program her DVR via a web connection to record a particular movie later that evening. In another example, an athlete participating in one sporting event can program his DVR via a mobile device (e.g., Smartphone) to record a televised sporting event occurring concurrently. In still one more example, a technologist that is unexpectedly out of the office may wish to program a DVR at work to record a webinar event that is to occur from a remote location in the middle of the night.

With traditional systems, the user is not able to program their DVR to record the desired programming unless the user is in close proximity to the DVR (e.g., the user is in the same room). For example, an employee working late would miss recording the movie unless she knew that she would be working late that evening, and she programmed the DVR before heading to work. Similarly, an athlete participating in a sporting event would miss recording the concurrent sporting event unless he knew when both events would occur and pre-programmed his DVR. Since the duration and exact timing of a sporting event is difficult to predict in advance, a user often misses a chance to properly record the event. The technologist would miss recording the live webinar broadcast unless the event was programmed before leaving the office.

The system and method to remotely program a receiving device described herein permits a user to program a DVR from a remote location. The user may program the DVR from a computer, a mobile device, or from some other networked computing apparatus.

Figure 1:
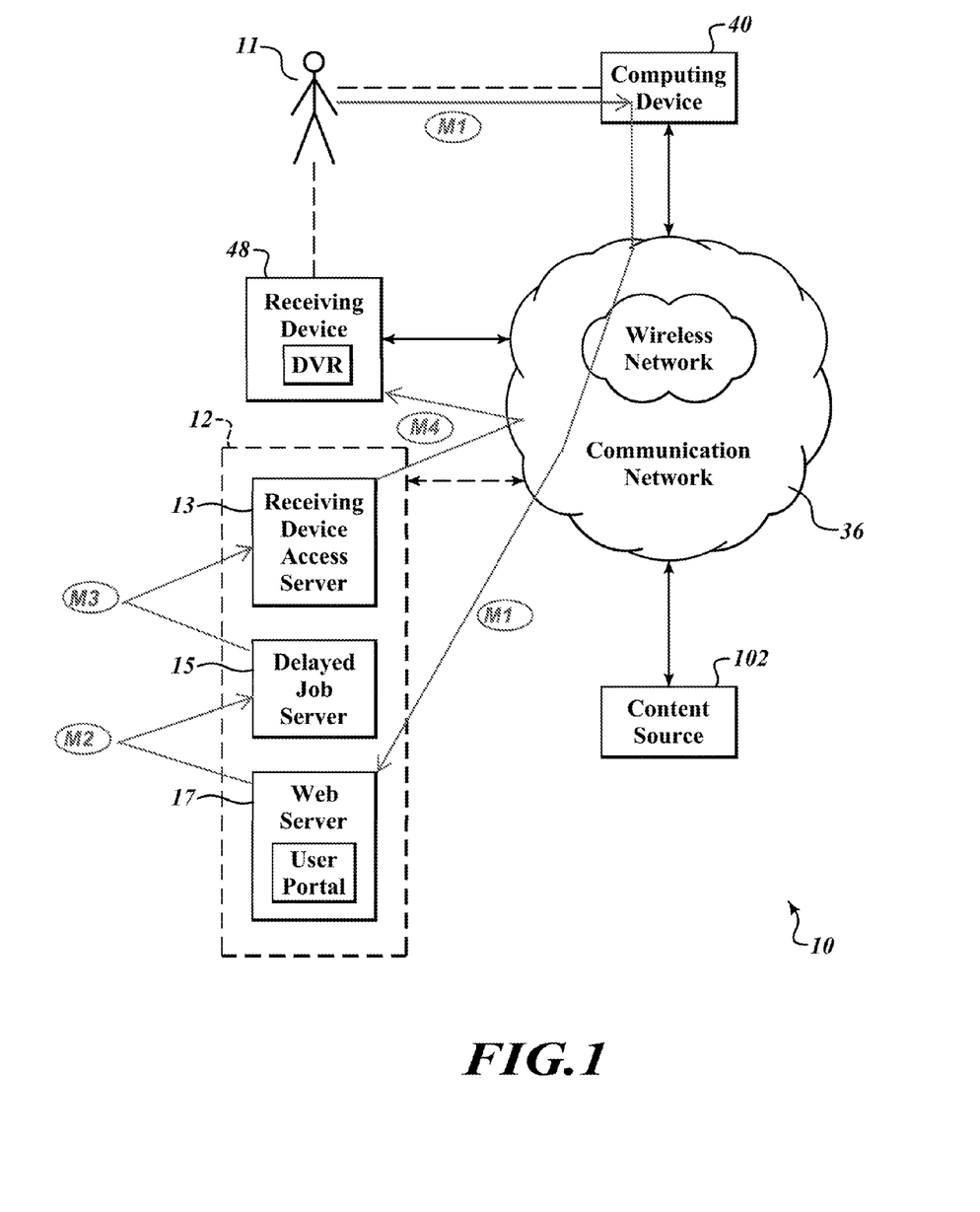
FIG. 1 is a system diagram to remotely program a DVR of a receiving device according to one embodiment.

FIG. 1 illustrates a remote programming system 10 embodiment. The remote programming system 10 is useful to remotely program a digital video recorder (DVR) of a receiving device. A user 11 is associated with a computing device 40 (e.g., computer, smart phone, Internet tablet, etc.) and a receiving device 48. FIG. 1 illustrates a single user 11 and a single receiving device 48 for simplicity, however, the system is scalable to interact with hundreds, thousands, or more users, and each user may be associated with several receiving devices.

The remote programming system 10 communicatively couples various electronic devices via a communication network 36. The communication network may include both wired and wireless communication paths. The communication network may also include the "Internet," "world wide web," or other networks, including International, domestic, local, and personal area networks.

The receiving device 48 (e.g., a set top box) includes a DVR. The receiving device 48 receives programming content (e.g., television shows, sporting events, etc.) from a content source provider 102 via the communication network 36. A copy of the programming content may be recorded by the DVR of the receiving device 48. In the prior art, in order to program the receiving device 48, the user 11 is in close proximity to the receiving device 48, and the user 11 issues commands to the DVR of the receiving device 48 to record the programming content. The recording, in some cases, is programmably delayed to occur at a later time when the user may or may not be in close proximity to the receiving device 48.

The remote programming system 10 of FIG. 1 further includes an application server 12. The application server 12 optionally includes a receiving device access server 13, a delayed-job server 15, and a web server 17. The various servers can share computing resources of one computing server device, or the various servers can be implemented in separate devices in any useful combination. The application server 12 can be close to the user's computing device 40, or the application server can be far away. In either case, the application server 12 can be communicatively linked to the computing device 40 via the communication network 36.

In one example of the present invention, user 11 operates computing device 40 to cooperatively interact with an associated receiving device 48 via an application server 12. Using a conventional Internet browser, user 11 sends and receives information through a user portal of web server 17. Some of the information sent by user 11 to web server 17 is correlated with a user account. The user account information is then used to identify the associated receiving device 48. FIG. 1 illustrates a first message M1 sent by the user through the computing device 40. The first message M1 is forwarded through the communication network 36 to the web server 17.

The web server 17 communicates with the delayed-job server 15 in a way that allows the user portal to provide a non-blocking Internet experience to the user 11. FIG. 1 illustrates a second message M2 passed between the web server 17 and the delayed-job server 15. In response to the web server 17 communication, the delayed-job server 15 queues one or more job entry messages. The job entry messages are pulled from the queue according to a determined protocol (e.g., round-robin, prioritized, etc.), and commands and responses are communicated to and from the receiving device 48. The commands and responses may be handled by the delayed-job server 15 or by the optional receiving device access server 13. A third message M3 is illustrated as communicated between the delayed-job server 15 and the optional receiving device access server 13, and a fourth message M4 is illustrated as communicated between the receiving device access server 13 and the receiving device 48. The commands and responses may be used to retrieve information from the receiving device 48. The commands and responses are used to direct the receiving device 48 to perform functions on the DVR (e.g., record a program at a determined time, on a determined channel, for a determined duration).

Accordingly, one advantage of the remote programming system 10 is that the user 11 no longer needs to be in close proximity to an associated receiving device 48 in order to program the DVR. Instead, the user 11 may program an associated DVR from a remote location via a networked computing device 40.

Another advantage of the remote programming system 10 is that the application server 12 abstraction between user 11 and receiving device 48 permits the computing device 40 to operate in a non-blocking way. That is, the user can operate the computing device 40 so as interrogate and command the associated receiving device 48 without the appearance of latency related to the actual time necessary to access the receiving device 48.

Figure 2:
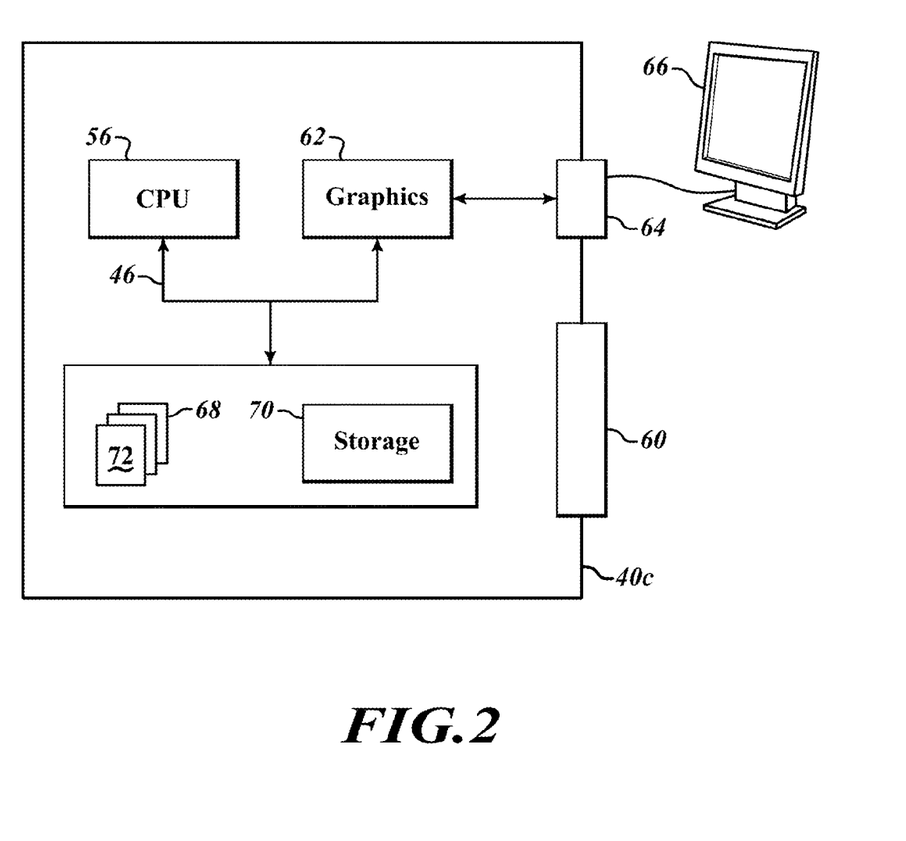
FIG. 2 is a block diagram of a computing device according to one embodiment.

FIG. 2 is a block diagram of one embodiment of a computing device. In FIG. 2, the computing device is a user computer 40*c*; however, the elements of user computer 40*c* are applicable to a portable computer and other computing platforms (e.g., see FIG. 5, laptop computer 40*b*). That is, embodiments of user computer 40*c*, a laptop computer, or other like computing devices may be configured as part of a system operable to execute methods to perform remote DVR programming.

User computer 40*c* has an architecture that includes operative hardware found in a conventional computing apparatus. The operative hardware is coupled via one or more directional or bi-directional bus structures 46. The operative hardware includes, for example, one or more central processing units (CPUs) 56, volatile and non-volatile memory 58, serial and parallel input/output (I/O) circuitry 60 compliant with various standards and protocols, wired and/or wireless networking circuitry are all components that may be found in the platform. A graphics engine 62 may supply or receive data through a graphics port 64. The graphics engine 62 and graphics port 64 may optionally be present and configured to provide output to a display 66. The display 66 is integrated with the user computer 40*c* or externally coupled to the user computer 40*c*.

Memory 58 comprises executable software instructions 68 and storage space 70. The storage space may include a file system, dynamically created data structures, a stack structure, local storage space, and the like. The executable software instructions 68 are also called system software 68.

The system software 68 is found in a conventional computing platform and includes an operating system and software to direct operations through the I/O circuitry, networking circuitry, and other peripheral component circuitry. System software 68 may include application software such as network software for communicating with other computing devices, database software for building and maintaining databases, and task management software for distributing the communication and/or operational workload amongst various CPU's.

In many cases, the methods for conducting remote DVR programming described herein are delivered with a conventional Internet web browser. In other cases, software 68 has a remote DVR programming software application 72 to conduct remote DVR programming. In such cases, the optional remote DVR programming software application 72 particularly configures the computing platform 40*c* to execute methods to perform remote DVR programming as described herein.

Figure 3:
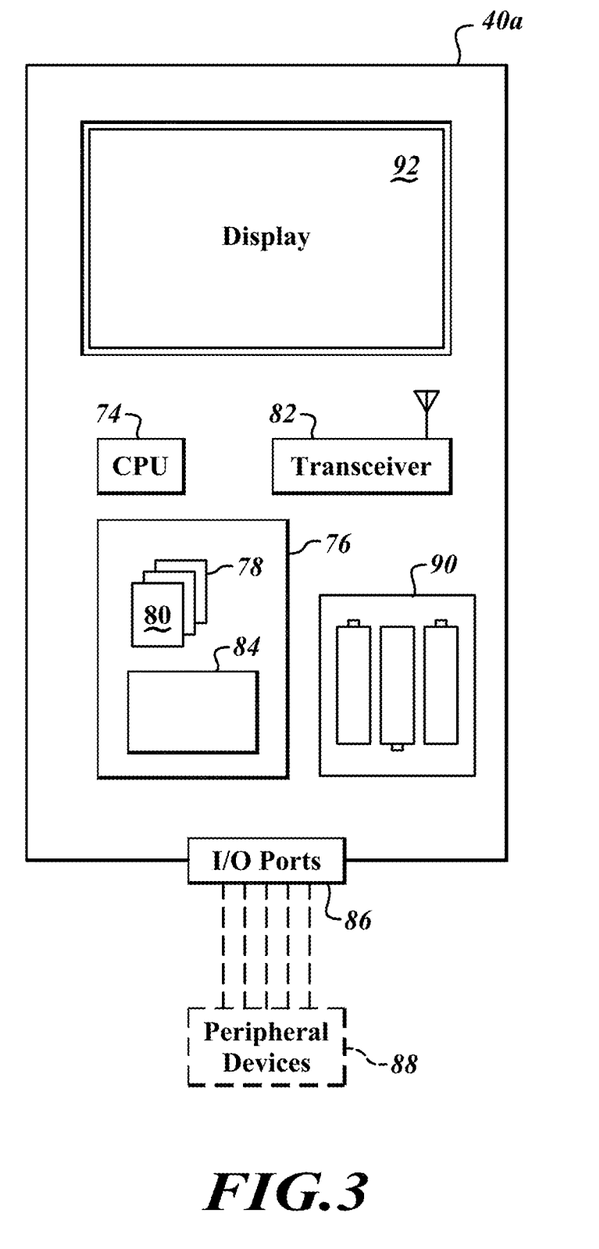
FIG. 3 is a block diagram of a mobile device according to one embodiment.

FIG. 3 is a block diagram embodiment of a mobile device 40*a*. The representative illustration of FIG. 3 is one non-limiting example of the type of mobile wireless device that can be used to implement a system and method to perform remote DVR programming according to one embodiment. Many other mobile devices, including personal media players (PMP's), personal digital assistants (PDA's), handheld personal computers (HPC's), web pads, tablets, global position system (GPS's), gaming devices, and the like can also be configured as described herein to implement a system and method to perform remote DVR programming. In fact, virtually any fixed or mobile computing device with a compatible wired or wireless transceiver and proper configuration to communicated via network 36 can be a mobile device 40*a*.

The mobile device 40*a* is an electronic communication device having one or more central processing units 74 and volatile and/or non-volatile memory 76. The memory 76 stores instructions and data acted on by CPU 74.

Inside memory 76, a particular collection of software instructions 78 may be executed by CPU 74. The software instructions 78 typically include an operating system, conventional software applications, device drivers, and the like. The software instructions 78 may also include a particular mobile device remote DVR programming application 80. The remote DVR programming application 80 is useful to perform the methods of conducting remote DVR programming described herein. In other cases, a conventional Internet web browser for mobile devices, which is part of software instructions 78, is used to perform the methods of conducting remote DVR programming.

A wired or wireless transceiver 82 may be used to communicate with an application server 12. That is, remote DVR programming data may be communicated from the application server 12 to the mobile device 40*a* via the transceiver 82, and remote DVR programming commands may be communicated from the mobile device 40*a* via the transceiver 82.

The data of the remote DVR programming may be stored in data storage area 84 of memory 76. The data storage area 84 may include a file system, database, stack space, local variables, or other data structures. Some or all of the remote DVR programming data is communicated from the mobile device 40*a* via the transceiver 82.

The mobile device 40*a* may have a collection of input/output (I/O) ports 86. The I/O ports 86 are useful for coupling hardware or software peripheral devices 88 to the mobile device 40*a*. There may be one or more optional hardware or software peripheral devices 88 coupled to the mobile device 40*a* via the I/O ports 86.

In some embodiments, the optional peripheral devices 88 may be used for passing data over short distances to and from the mobile device 40*a*. For example, serial ports, USB ports, WiFi ports, Bluetooth ports, IEEE 1394 FireWire, and the like can communicatively couple the mobile device 40*a* to other computing apparatuses such as receiving device 48. Additionally, the I/O ports 86 can be used to couple other optional peripheral devices 88 such as keypads, touch screens, navigation dials, light emitting diodes (LEDs) or other illumination outputs, audio devices, vibrating devices, motion sensors or other motion detection devices, and other mobile device components to the internal hardware and software of the mobile device 40*a*.

Mobile device 40*a* has a power source (e.g., battery) 90 and a display 92. The display 92 is used to communicate remote DVR programming information to a user of the mobile device 40*a*.

Figure 4:
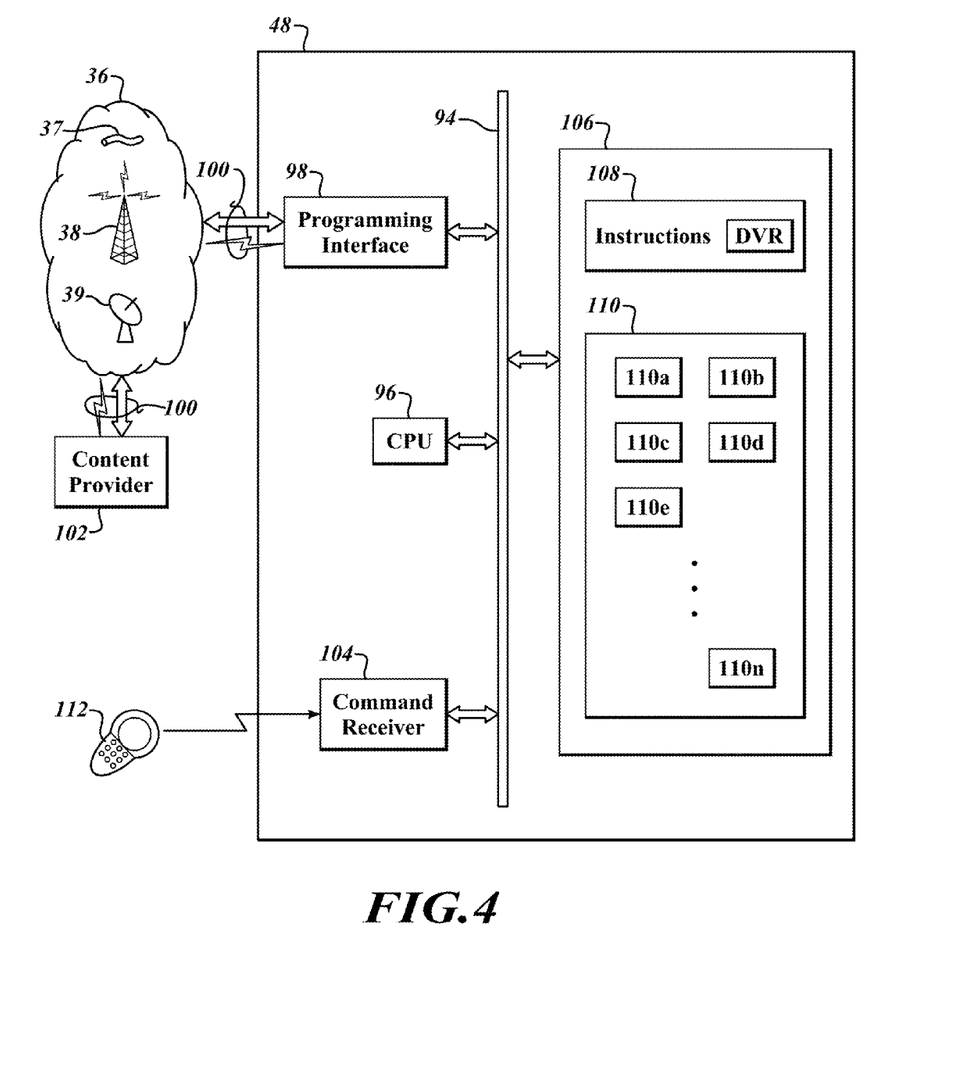
FIG. 4 illustrates a block diagram of a receiving device operating in a digital video recorder (DVR) remote programming system according to one embodiment.

The cellular transceiver 82 is used to couple the mobile device 40*a* to other communication devices through a communication network 36 (e.g., cellular communication network 38 of FIG. 4). In some cases, software 78 and data in storage area 84 are communicated between the mobile device 40*a* and an application server 12 via the cellular transceiver 82. That is, bi-directional communication between a mobile device 40*a* and an application server 12 is facilitated by the cellular transceiver 82.

FIG. 4 illustrates a block diagram embodiment of a receiving device 48 operating in a digital video recorder (DVR) remote programming system. Receiving device 48 includes a system bus 94, one or more central processing units (CPU) 96, volatile and non-volatile memory 106, and a programming interface 98 for receiving audio/video/control/data programming content 100.

In the exemplary embodiment illustrated in FIG. 4, CPU 96, programming interface 98, a command receiver 104, memory 106, and other circuits are communicatively coupled to each other via system bus 94.

The audio/video/control/data programming content 100 is provided by a content provider 102 via the communications network 36.

The communications network 36 includes conventional cable communication networks 37, cellular communication networks 38, satellite networks 39, fiber-optic networks, and the like. In one embodiment, the communications network 36 includes any communication hardware and software that cooperatively works to enable users of computing devices to view and interact with Internet web pages. The communication network 36 includes communication hardware and software to enable users of receiving devices to receive audio/video/control/data programming content 100 by one or more wired or wireless means.

The audio/video/control/data programming content 100 may be provided via cable communication networks 37, cellular communication networks 38, satellite networks 39, and the like. The communication between the content provider 102 and the receiving device 48 may include both wired and wireless communication paths. In some embodiments, the communication of audio/video/control/data programming content 100 with the receiving device 48 is bi-directional.

The command receiver 104 of receiving device 48 is operable to receive user commands from an external source. The user commands are entered by a user to control and/or respond to audio/video/control/data programming content 100. FIG. 4 illustrates that command receiver 104 is responsive to user commands input from a remote control 112, however, in other embodiments, different external sources may provide user command input to the command receiver 104. For example, key pads, touch screens, mobile devices 40c, and the like may alternatively or additionally provide user commands to the command receiver 104.

In some embodiments, the external source of user command input to command receiver 104 may be physically separate from receiving device 48. For example, FIG. 4 illustrates remote control 112 as physically separate from receiving device 48. In some embodiments, the external source of user command input to command receiver 104 may be an integral part of receiving device 48. For example, in some embodiments, a keypad on the receiving device 48 may provide user command input.

In some non-limiting embodiments, the command receiver 104 is operable to affirmatively acknowledge receipt of the user command input back to the external source. In one non-limiting example, a keypad on the receiving device 48 may be operative to input a user command to the command receiver 104, and the command receiver 104 may provide an audible and/or visual output on the receiving device 48.

Memory 106 includes executable software instructions 108 and storage space 110. The software instructions may include instructions to control particular receiving device hardware for implementing a digital video recorder (DVR) feature.

The storage space may include a file system, dynamically created data structures, a stack structure, local storage space, and the like. Storage space 110 may have an area or device dedicated for storing information representative of programs currently recorded on the DVR (i.e., audio/video/control/data programming content 100). The program content may be stored in program content area 110a as it was received by receiving device 48, or the program content may be stored in some other way.

Storage space 110 may have a timer storage area 110b. The timer storage area 110b is used to store information representative of timers programmed on the digital video recorder. The timers are used with the DVR to record programs at a particular time, on a particular channel, and/or for a particular duration.

Storage space 110 may have a premium content storage area 110c. In some cases, a user of the receiving device 48 may wish to receive programming content not normally delivered without a fee. In such cases, a user (e.g., a subscriber) may particularly arrange to pay for the premium content. For example, a sports enthusiast may purchase a viewing of a boxing match. In such cases, information representative of premium programs accessible by the receiving device 48 is stored in premium content storage area 110c.

Storage space 110 may have an accessible channel storage area 110d. A receiving device 48 is typically associated with a user having a subscriber account. The user and a content provider 102 have a relationship whereby the associated receiving device 48 is granted access to particular program channels 100 delivered by the content provider 102. Channel listings, coded channel entries, or other data related to the programming content 100 that is authorized by content provider 102 can be stored in the accessible channel storage area 110d.

Storage space 110 may have a user account storage area 110e. The user account storage area 110e can be used to store information that identifies a particular user 11, information related to payment for services, information related to the geographic location of the receiving device, and other data. In some cases, charges accrued by the user are stored in the user account storage area 110e. In one case, if a particular function is remotely commanded by a user to be performed on the receiving device 48, a charge for performing the function may be assessed to the user's account, and information related to the charge may be stored in the user account storage area 110e.

Storage space 110 may have other storage areas 110n. The other storage areas are useful for operations of the receiving device 48. For example, the location or other identifier of the receiving device 48 can be stored. The type of output display or audio device coupled to the receiving device 48 can be stored. Software version numbers related to the receiving device 48 can be stored. Other information can be stored as well.

Figure 5:
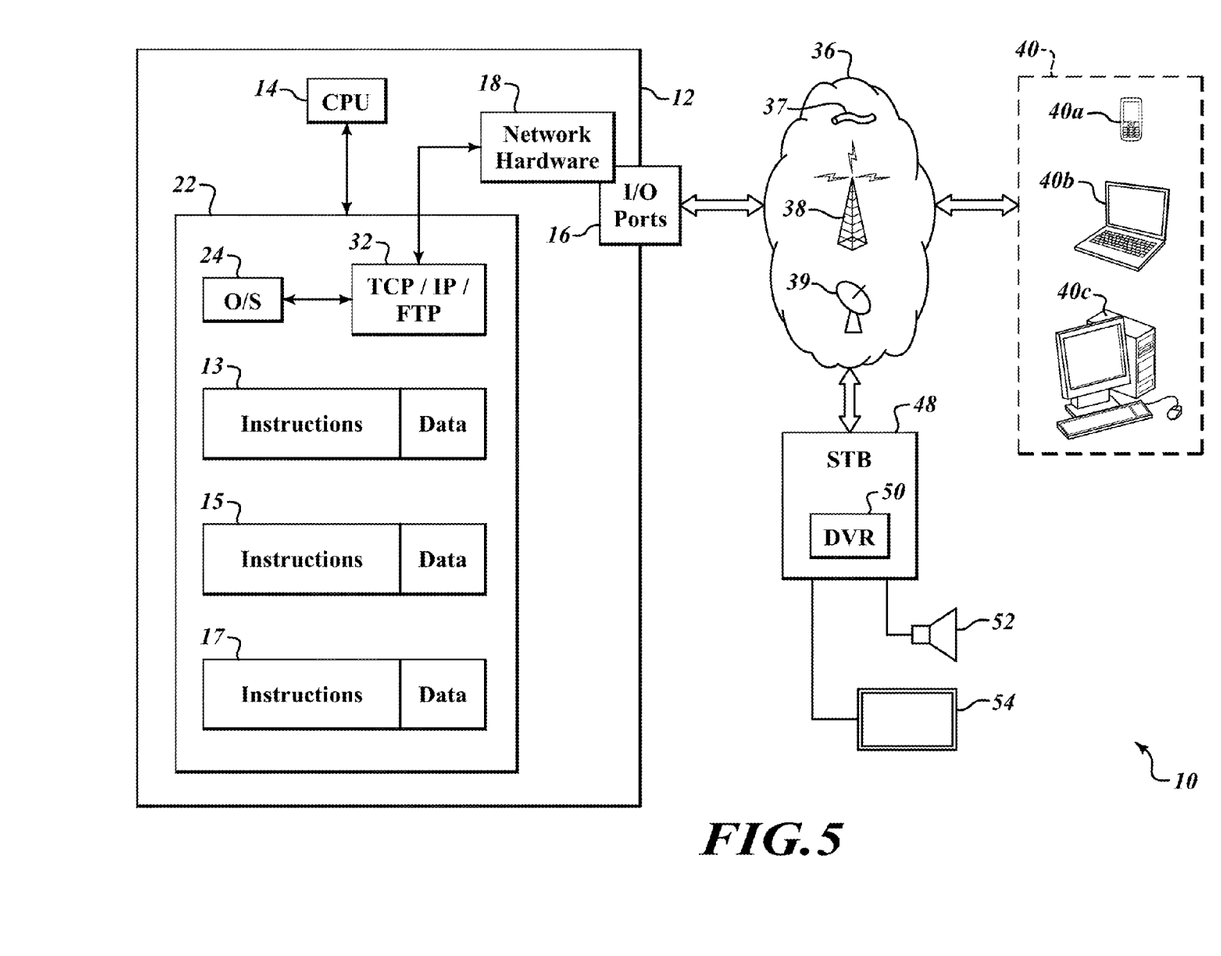
FIG. 5 is a system diagram to remotely program a DVR of a receiving device in more detail according to one embodiment.

FIG. 5 is a system diagram embodiment to remotely program a DVR of a receiving device 48 in more detail. In the example of FIG. 5, the receiving device 48 is a set top box. In the remote programming system 10, an application server 12 computing device is shown.

In some cases, application server 12 is a single hardware machine having the hardware and software listed herein, and in other cases, application server 12 is a networked collection of hardware and software machines working together in a cloud or server farm to execute the functions of remote DVR programming. For simplicity, some conventional hardware and software of application server 12 is not shown in FIG. 5.

As described herein, the application server 12 of various figures is illustrated for simplicity as performing the receiving device access server 13 duties, the delayed-job server 15 duties, and the web server 17 duties. In some embodiments, however, the duties of the various servers are performed by separate computing servers that are communicatively coupled. In such cases, the receiving device access server 13, the delayed-job server 15, and the web server 17 may be geographically close or the servers may be spread far apart.

FIG. 5 illustrates computing resources 40, which may optionally include a mobile device 40a, a portable computer 40b (e.g., a laptop computer), and a conventional user computer 40c. In one embodiment, the computing devices 40 enable subscribers of audio/video/control/data program content to remotely program an associated DVR. In some cases, information related to the remote DVR programming is communicated from and between the computing devices 40 via communications network 36. The remote DVR programming data is also communicated, via communications network 36, from and between the computing devices 40 and the application server 12 where the information is processed. The processed remote DVR programming data is communicated by application server 12 back to the remote DVR programming subscriber. In some cases, the application server 12 interactively presents the data to the remote DVR programming subscriber and others via the Internet.

Computing devices 40 comprise one or more computing devices operating separately or in a networked environment. In some cases, computing devices 40 are conventional computing devices each operated by a single user. In other embodiments, computing devices 40 are networked devices such as computers processing data for other industrial, commercial, or business purposes.

A receiving device 48 is embodied as a set top box (STB). The receiving device 48 of FIG. 5 has a digital video recorder (DVR) 50 integrated within; however, the STB and DVR could be separate devices. Typically, the STB 48 receives audio, video, control, and/or computing data programming content via conventional means. That is, the programming content may be delivered to the STB 48 via a satellite system 39, a cable system 37, an over-the-air system 38, or by some other means. The programming content may be processed and output to one or more output subsystems such as audio subsystem 52 and video system 54.

Application server 12 is a computing server having operative electronic circuitry including a central processing unit 14 (CPU), multiple input/output (I/O) ports 16, a high bandwidth network connectivity circuitry 18, and memory 22.

The CPU 14 of the application server 12 retrieves and executes instructions from memory 20. An operating system 24 includes application and driver software that enables additional application software and system administrators to control the operation of server 12. For example, particular applications and drivers accept user input and provide system output through I/O ports 16. Keypads, computer mice, memory cards, serial ports, bio-sensor readers, touch screens, and the like may be coupled to the I/O ports 16 to permit a system administrator or other application-server operator to input control information into the application server 12. Displays, printers, memory cards, LED indicators, speakers, and the like are all useful to present information to the application-server operator.

The high bandwidth network connectivity port 18 may share circuitry and/or software of one or more I/O ports 16. The high bandwidth network connectivity port 18 may include electronic networking circuits such as a Digital Signal 1 (T1), Digital Signal 3 (T3), fiber-optic, Ethernet, fax/modem, and other telecommunications circuits. The communications circuits of the high bandwidth network connectivity port 18 provide the hardware layer interconnectivity of the application server 12, through communications network 36 to a wide range of outside computing resources.

In an embodiment of the application server 12 of FIG. 5, within memory 22, several software programs are resident including an operating system 24 and an intermediary networking software application 32. The intermediary networking software application 32 is a collection of one or more software programs that provide connectivity to computing resources outside of the application server 12. For example, conventional transmission control protocol/Internet protocol (TCP/IP), file transfer protocol (FTP), user datagram protocol (UDP), and the like are useful to enable data such as web pages to be served to outside computing resources, and further are useful to enable users of outside computing resources to input data into the application server 12.

Operating system 24 is bi-directionally coupled to the intermediary networking software application 32, and the intermediary networking software application 32 is bi-directionally coupled to individual circuits of the high bandwidth network connectivity port 18. The bi-directional coupling enables software applications to solicit and accept input information and output remote DVR programming data commensurate with the input information.

Memory 22 optionally has software instructions that implement the functions of a computing server. The computing server functions may be resident in a single application server 12, or they may be resident in separate machines or in some combination thereof. The operating system hosts the computing server functions of application server 12.

In the illustration of FIG. 5, memory 22 includes software instructions and data storage space to implement functions of a receiving device access server 13, a delayed-job server 15, and a web server 17. For simplicity, the instructions and storage space that implement the computing functions are individually recognized as a receiving device access server 13, a delayed-job server 15, and a web server 17.

Receiving device access server 13 is configured to bi-directionally communicate messages with a receiving device 48. The receiving device access server 13 may communicate messages with hundreds or thousands of receiving devices or more. In some cases, the receiving device access server 13 operates independently as programmed to interrogate and command receiving devices. In other cases, the receiving device access server 13 acts under the direction of outside computing resources.

In the remote programming system 10 of FIG. 5, the receiving device access server 13 exchanges messages with a receiving device 48 through communication network 36. The communication may occur through via any mechanism accessible by the server 13 and the receiving device 48. That is, in some cases, the communication is via a satellite system; in other cases, the communication is via a telecommunications system. Accordingly, there may be an undesirable small or large latency between the communication of a message to a receiving device 48 and the response from the receiving device 48.

The receiving device access server 13 may interrogate a receiving device 48 with message requests for information. A single message may request one or more types of information. Accordingly, in some cases, a response to a message from a receiving device may have a variable number of data bits. The receiving device access server 13 may request specific information stored in a memory 110 of receiving device 48. For example, information that may be requested may reside in program content area 110a, timer storage area 110b, premium content storage area 110c, accessible channel storage area 110d, user account storage area 110e, and other storage areas 110n.

The receiving device access server 13 may pass commands to a receiving device 48 to perform a particular function. The command may cause the receiving device 48 to update memory 110. For example, in one case, a message to a receiving device 48 commands the DVR functionality of the receiving device 48 to record a particular program at a determined time. The command will cause the receiving device to update its timer storage area 110b. As the program is recorded, the receiving device will update its program content area 110a. Other command messages will direct the receiving device 48 to perform different functions.

Web server 17 is configured to bi-directionally communicate messages with a user 11. Typically, the communication of messages is performed according to an Internet protocol, but some other protocol can also be used. For example, the communication may be by hypertext transfer protocol (HTTP) messages or by some other means.

Web server 17 is hosted by operating system 24, which may also include a web server software application (e.g., Microsoft Internet Information Services web server). In some cases, web server 17 is an application that functions within an Internet web environment, and in other cases, web server 17 is a standalone program that directly interacts with users.

In the remote programming system 10 of FIG. 5, web server 17 hosts static and dynamic web page screen data that particular users of the Internet are capable of interactively viewing. A user 11 is able to virtually open a user portal by providing user account information to web server 17. The user portal associates the user account with a particular receiving device 48. The user portal allows user 11 to interrogate and program the associated receiving device 48.

In one embodiment, web server 17 is configured to present web pages to a user 11. The web pages are dynamically generated by web server 17, and the web pages present information corresponding to a receiving device 48 (e.g., a digital video recorder) associated with the user 11. The user portal of web server 17 is configured to accept input information from the user 11 to control the receiving device 48.

A delayed-job server 15 is illustrated in FIG. 5. The delayed-job server 15 bi-directionally communicates with both the receiving device access server 13 and the web server 17. The communication may be by hypertext transfer protocol (HTTP) messages or by some other means.

The delayed-job server 15 is configured to accept input requests from web server 17 and store job entries corresponding to the web server 17 input requests in a message queue. The delayed-job server 15 is configured to process the job entries from the message queue and create function requests representative of the web server 17 input requests. The function requests are communicated to the receiving device access server 13 for action on the receiving device 48. Subsequently, the receiving device access server 13 provides responses to the function requests back to the delayed-job server 15.

The delayed-job server 15 is configured to communicate data from a response to a function request back to web server 17. Web server 17 then may present the response data to user 11 via the user portal.

A data storage area (e.g., a data repository) is associated with the delayed-job server 15. The data repository is configured to store information from function request responses and timestamps. That is, when data from a receiving device 48 is communicated back to the delayed-job server 15, the data is time stamped and stored, and the data is communicated back to the web server 17. If the web server 17 makes a subsequent request for the data, then the delayed-job server 15 evaluates the timestamp. If the data is "stale," then the delayed-job server 15 creates and communicates a new function request to the receiving device access server 13. If the data is not stale, the delayed-job server 15 provides the data (i.e., the information from the previous function request response) to web server 17 without creating a corresponding new function request.

The data storage area of delayed-job server 15 may be any type of data storage system that works cooperatively to support features of the remote DVR programming system 10. For example, the storage area may be a database, a series of hard-coded dynamic data structures, a set of linked lists, or any combination thereof. The data storage area may be embodied in a single device or may be distributed in multiple devices. In some cases, the data storage area is partially or wholly remote from the delayed-job server 15 and accessible over a network.

In one embodiment, the delayed-job server 15 is configured to execute a management process and a plurality of worker threads. The management process may be a supervisory process or a user process that is hosted by the operating system 24. In some cases, the management process handles all tasks associated with the functions of the delayed-job server 15. In some cases, the management process handles all tasks associated with both the delayed-job server 15 and the receiving device access server 13. In still other cases, the management process spawns the one or more worker threads to handle tasks associated with the functions of the delayed-job server 15.

The management process generally handles input requests to perform functions on receiving devices from the web server 17. That is, when a user 11 sends a request for information or a command to control a receiving device 48 through a user portal, web server 17 formulates a function request and communicates the request to the delayed-job server 15. The management process receives and handles the function request.

In the course of handling a function request from web server 17, the management process correlates the function request with a particular user account and a particular receiving device 48. One logic mechanism used to correlate the user account is via information embedded in the function request. The information may be encrypted. The information may be a username and password, a unique user identifier, or some other information. The information may also identify one particular receiving device of a plurality of receiving devices associated with the user 11. Accordingly, from information in the input request, the management process is able to identify a particular receiving device 48.

The management process may then create a job entry from the input request. The job entry can be stored in a data repository of memory 22. The data repository may be configured as a message queue, a first-in-first-out buffer, a linked list, or in some other format.

Job entry information that is stored in the data repository associated with delayed-job server 15 is retrieved and acted on. In some cases, the job entry is retrieved by a worker thread. There are many ways in which the job entry may be retrieved and acted on. For example, in one case, the management process administers a round-robin scheduler and worker threads are given time to process job entry requests. In other cases, the job entries are prioritized and worker threads that reach an idle state remove the prioritized entries for processing. In still other cases, the job entries are tagged for action by particular worker threads. Other mechanisms to retrieve and process the job entries may also be used.

When a worker thread or management process acts on a job entry, a corresponding function request is generated. The function request is communicated to logic associated with the identified receiving device 48.

In some cases, the logic associated with the identified receiving device 48 is implemented by the receiving device access server 13. It is also possible; however, that the logic associated with the identified receiving device 48 is implemented directly by the delayed-job server 15. It has been learned that web server 17 does not efficiently interact with a receiving device 48. It has further been learned that web server 17 does not efficiently interact with a receiving device access server 13. The inefficiencies are often related to the time latencies realized when communicating with a receiving device 48. There can be other disruptions, communication errors, and a number of other disturbances that occur in the operation of the web server 17 and the network 35. When unexpected time latency or other errors occur, the user portal may "crash" or appear to crash and provide an undesirable user experience.

The delayed-job server 15 does not suffer from the same inefficiencies as the web server 17. Accordingly, web server 17 is configured to bi-directionally communicate with delayed-job server 15, and delayed-job server 15 may interact with either receiving device access server 13 or receiving device 48.

The delayed-job server 15 receives a response from the logic associated with the identified receiving device 48. That is, the delayed-job server 15 may receive a response from either the receiving device 48 or from the receiving device access server 13. The response contains information corresponding to the function request. The information from the response is stored in the data storage area associated with the delayed-job server 15, and the information is provided back to the web server 17, which updates the user portal.

Figure 6:
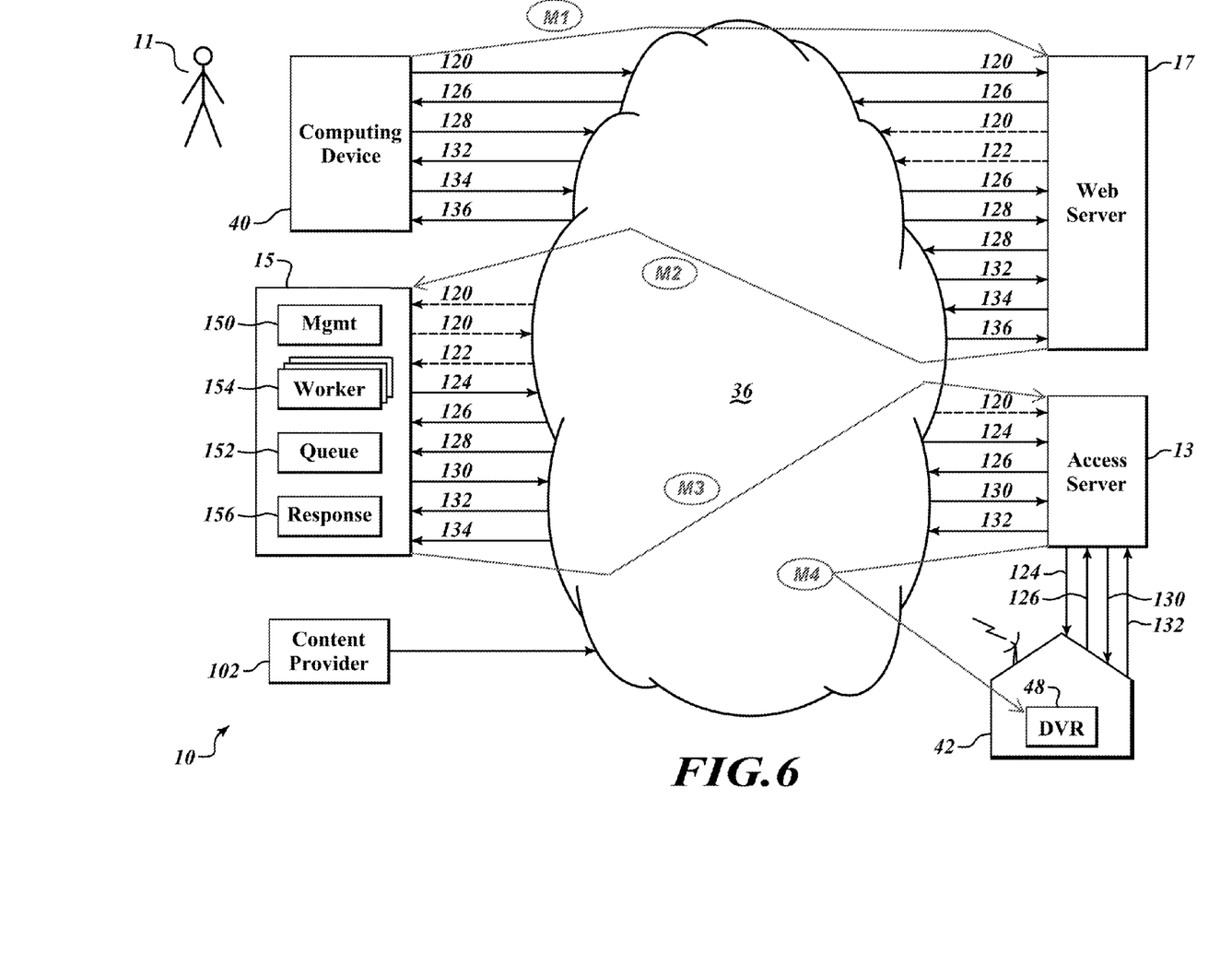
FIG. 6 illustrates a DVR programming data flow through a remote programming system block diagram according to one embodiment.

A non-limiting example is now presented wherein a user 11 remotely programs a receiving device 48 DVR using the remote programming system 10 illustrated in FIG. 6. FIG. 6 illustrates a DVR programming data flow through a remote programming system block diagram embodiment 10. Various computing servers have been illustrated as separate devices, but it is understood that the servers may cooperatively be implemented as a single device, a server farm, or any other communicative network. In FIG. 6, a receiving device access server 13, a delayed-job server 15, and a web server 17 are illustrated as separate devices.

With respect to FIG. 1, messages M1-M4 are also shown in FIG. 6 to broadly illustrate the conceptual messaging between a user's computing device 40 and an associated receiving device 48. The messages M1-M4 broadly comprise the more detailed messages 120-134 that are also illustrated in FIG. 6. For example, message M1 includes messages that convey user information 120, first function request response 126, request to record the television program 128, second function request response 132, request to purchase a pay-per-view presentation 134, and information previously stored in the storage area 136. Message M4 includes messages that convey first function request 124, first function request response 126, second function request 130, and second function request response 132. Messages M2 and M3 may be similarly understood to convey information conveyed between the various computing devices.

A user 11 is operating a computing device 40 in an area that is remote from the user's home 42. The user 11 wants to record a television program that will be broadcast before the user returns home. Thus, the user 11 is not able to program a DVR of a receiving device 48 located in his home 42 by conventional methods of the prior art.

The user opens a web browser application on the computing device 40 and navigates to a web site related to a content provider 102. The communications between the user's computing device 40 and the web site are passed through a communications network 36. Via the browser application, the user submits personal profile information 120 to the web site, and the web site opens a user portal. The user portal has one or more web pages that are particularly related to the user 11. The web pages are dynamically updated by the web server 17.

Personal user information 120 is information useful to uniquely identify a user of programming that originates from a content provider 102. Personal user information 120 may optionally include, but is not limited to, additional information about the user such as physical addresses, credit account information, and/or billing account information.

When the user 11 first accesses the user portal, one or more messages are generated to associate the user's personal profile information 120 with a particular user account. In some cases, the web server 17 is able to directly access the user account information. In other cases, as indicated in FIG. 6 by the dashed line messages, the user's personal profile information 120 is communicated to the delayed-job server 15, the access server 13, or another computing device (not shown). The user account information includes a particular identifier for each receiving device 48 that is associated with the user 11. FIG. 6 illustrates a single receiving device 48, but additional receiving devices could also be associated. In some cases, the user account is updated with personal profile information 120.

The opening of the user portal and the passing of the personal profile information 120 causes one or more update requests 122 to be generated. The first update request 122 may be an initialization request. The update request 122 may be initiated from web server 17 and communicated to delayed-job server 15, or the update request 122 may be initiated from delayed-job server 15.

A management process 150 in the delayed-job server 15 creates a job entry message. The job entry message is posted to a data repository message queue 152. A worker thread 154 picks up the job entry from the message queue 152 and acts on it. The worker thread 154 generates a first function request 124.

The first function request 124 will have particular identification information. For example, the first function request 124 may identify the receiving device 42, the user 11, the user portal, or the first function request 124 may have other identification information.

The first function request 124 is communicated to logic associated with the receiving device 48. In the embodiment of FIG. 6, the logic is embodied in a receiving device access server 13. In other embodiments, the logic is a function in the delayed-job server 15 that communicates with the receiving device 48.

In the receiving device access server 13, the first function request 124 is communicated to the receiving device 48.

The receiving device 48 will respond to the first function request 124 by providing information commensurate with the first function request 124. For example, the receiving device 48 will retrieve information representative of programs currently recorded on the receiving device, information representative of timers programmed on the receiving device, information representative of premium programs accessible by the receiving device, and information representative of program channels accessible by the receiving device. The receiving device 48 may retrieve information representative of other stored data items.

The receiving device 48 will generate a first function request response 126 having the requested information. The first function request response 126 is presented to the logic associated with the receiving device 48. In the embodiment of FIG. 6, the logic is embodied in a receiving device access server 13. The first function request response 126 is communicated to the delayed-job server 15 and forwarded to the web server 17. In addition, the first function request response 126 information is stored in the response storage area 156 of the delayed-job server 15. A time stamp associated with the first function request response 126 is also stored.

During the time after the web server 17 communicated the update request and the time when the first function request response 126 is delivered to web server 17, the user portal is not blocked. That is, user 11 may continue to operate the browser and perform functions on the computing device 40. In some cases, an indication is presented to user 11 on computing device 40 that information will soon be updated.

In the Example of FIG. 6, the user 11 can now view a representation of data stored on an associated receiving device 48 that is remotely located in the user's home 42. In addition, user can provide input requests in response to an input mechanism of a web page presented to user 11 by the user portal. That is, the user portal can present a web page to user 11 that solicits input to control one or more associated receiving devices. When responses to the input requests are received, the response records are provided to an output mechanism of a web page presented to user 11 by the user portal.

User 11 wants to record a television program that will be broadcast before the user returns home. Using the web browser operating on computing device 40, user 11 can provide input to command the receiving device 48 to record the determined television program. In other situations, user 11 can provide input requests to perform many other functions on a receiving device 48. For example, the user portal can accept input from user 11 to set timers, clocks, power controls, recording resolutions, channels, and the like. The user 11 can manipulate program content that is resident on the receiving device 48. The user 11 can even authorize the purchase of a product or service such as premium programming content.

In some embodiments, the delayed-job server 15 maintains a record of the request and also a confirmation from the receiving device access server 13 as a result of successful communications with the receiving device 48. If the communication fails after user 11 inputs the request into computing device 40, the delayed-job server 15 will still maintain the request. According to a configurable schedule, the delayed-job server 15 will continue to attempts to effect successful communications, even if on a substantially delayed basis. Thus, user 11 can be assured that even if errors occur in the communications after the request has been input, the request will be fulfilled if the communication errors are resolved.

In the example of FIG. 6, the user input request to record the television program 128 on the particular channel at the particular time is communicated from computing device 40 to web server 17. The input request 128 is communicated to delayed-job server 15, a job entry is queued, and the job entry is acted on. The delayed-job server 15 generates a second function request 130, which is communicated to the receiving device 48 via the receiving device access server 13.

The receiving device 48 acts on the second function request 130, appropriately programs the DVR of the receiving device 48, and generates a second function request response 132.

In some cases, the command sent to the receiving device 48 causes a feedback indication on the receiving device 48. That is, the communication of commands to the receiving device 48 from a remote computing device 40 may cause the receiving device 48 to generate an indication that one or more functions have been performed on the receiving device 48. For example, once the DVR has been programmed, an indication can be configured as local feedback to a user in close proximity to the receiving device 48. The feedback may include configuring a display, configuring an illumination output (e.g., an LED), configuring an audio device, configuring a vibrating device, or some other feedback. For example, according to one embodiment, an employee is working late in the office and realizes that she will not make it home in time to watch her favorite program. In such case, the employee can program her DVR with the remote programming system 10. When she programs the DVR remotely, her spouse, who is at home, can see an indication that the DVR has been remotely programmed. The indication may be an LED, a display change, or some other feedback. The indication allows the spouse to continue watching a program (e.g., a sporting event) and not be concerned that his wife will miss her favorite program.

After performing the DVR programming function, the receiving device 48 communicates the second function request response 132 to the user's computing device 40 via the receiving device access server 13, the delayed-job server 15, and the web server 17. The second function request response 132 information is stored in the response storage area 156 of the delayed-job server 15, and a time stamp associated with the second function request response 132 is also stored. In some cases, the delayed-job server 15 also continues to maintain the second function request 130 as "active" until the second function request response 132 is received.

After the DVR is programmed, the user is able to verify that the DVR was correctly programmed based on the information from the second function request response 132. The information is presented on the display of the computing device 40.

Subsequently, user 11 may wish to program the associated receiving device 48 in a different way. For example, user 11 may input a request to purchase a pay-per-view presentation 134. The input request 134 will be communicated to the delayed-job server 15. In some cases, the delayed-job server may provide information previously stored in the storage area 136 back to the user's computing device 40.

For example, if the user had previously purchased the pay-per-view presentation, then this information may already have been retrieved from the receiving device 48. In such cases, a time stamp from the data previously stored in the response storage area 136 is evaluated. If a determined time has elapsed since the information was stored in response storage area 156, then new information will be requested from the receiving device 48 as previously described. Alternatively, if the determined time has not yet elapsed, then the information previously stored in the storage area 136 is returned. The return of previously gathered data that is determined to be "fresh" permits a faster update of information on the computing device 40. In some cases, the time that is used to determine whether or not data is "fresh" or "stale" is configurable.

Embodiments of the remote programming system 10 have other features.

For example, in one embodiment, the determination of whether or not data stored in response storage area 156 is fresh or stale is handled in a different way. In the embodiment, metadata information, which may or may not include a time stamp, is accepted and stored by the delayed-job server 15. The metadata is related interaction that user 11 has with the user portal. For example, as user 11 interacts with web server 17 to interrogate or configure receiving device 48, metadata is collected. If user 11 stops interacting with the user portal, different metadata or no metadata is collected. Based on the time that elapses between the collection of metadata and the storage of information in response storage area 156, the delayed-job server 15 determines if new data should be collected from the receiving device 48.

As another example, in one embodiment, remote programming system 10 may be used with a plurality of users and receiving devices. The remote programming system 10 can be operated with hundreds, thousands, or even more users and receiving devices. In an embodiment, the delayed-job server 15 can accept at least one user input request from each of a plurality of users. The delayed-job server 15 is configured to consolidate the user input requests. For example, multiple requests to the same receiving device or from the same user can be grouped together. Subsequently, the requested functions can be concurrently performed on a plurality of receiving devices.

Figure 7:
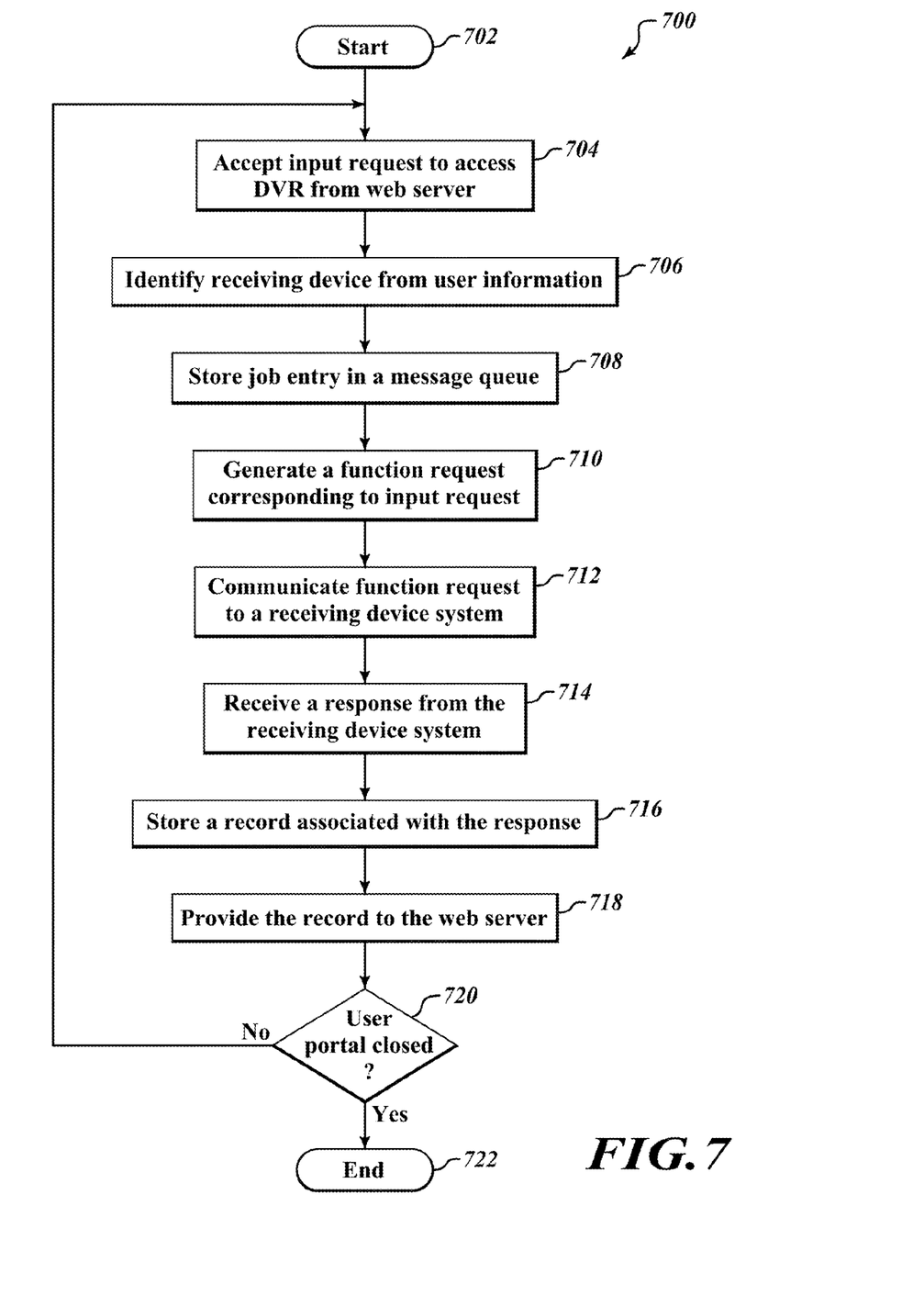
FIG. 7 is a flowchart illustrating a process to carry out a remote programming system according to one embodiment.

FIG. 7 is a flowchart illustrating a process used by an embodiment of a remote programming system. In this regard, each described process may represent a module, segment, or portion of code, which comprises one or more executable instructions for implementing the specified logical function(s). In some implementations, the functions noted in the process may occur in a different order, may include additional functions, may occur concurrently, and/or may be omitted.

With respect to FIG. 7, the process 700 is ongoing with the performance of actions on receiving devices. The process 700 begins at 702. At 704, a web server 17 accepts an input request directed to a receiving device 48 (e.g., a request to program a DVR). At 706, the receiving device 48 is identified based on user information 120 in the input request. A job entry is stored in a message queue at 708; the job entry corresponding to the input request. The job entry is retrieved from the message queue 152, and a corresponding function request is generated at 710. The function request is communicated to a receiving device system at 712. The receiving device system is configured to solicit operational information from the receiving device 48. The receiving device system is configured to program the receiving device 48 to perform digital video recording functions. At 714, a response is received from the receiving device system, and at 716, a record associated with the response is stored in a response storage area 156. The record is provided to the web server 17 at 718. If the user portal of web server 17 is closed at 720, the process ends at 722.

In some cases, the tasks related to the message queue at 708 are administered by a management process, and the tasks related to generating the function requests at 710 are administered by one of a plurality of worker threads. In some cases, execution of the process 700 will incur charges that are assessed to the user's account. For example, when the process identifies the receiving device 48 from the user information at 706, a user account may be identified. Subsequently, when a record of a successful performance of a function request (e.g., the DVR has been programmed) is provided back to the web server at 718, the charge may be assessed to the user account.

In some cases, the response stored at 716 in a response storage area 156 is re-used. In such cases, the record associated with the response is time stamped. Subsequently, if the web server presents a second input request directed to the receiving, and if the second input request solicits information that is already stored in the response storage area 156, then the time stamp will be evaluated. If the data is determined to still be fresh, then the time stamped record (e.g., the response previously acquired from the receiving device 48) is provided back to the web server.

As used herein, a "central processing unit (CPU)" includes any known single device or combination of devices for operationally controlling a computing device. The CPU executes software instructions read from a memory, generates data, and controls hardware circuitry.

As used herein, "memory," "memory devices," "storage," and the like includes any combination of volatile and/or non-volatile computer-readable media for reading and writing. The memory may be cache memory, embedded memory, or external memory devices accessible by a CPU. Volatile computer-readable media includes, for example, random access memory (RAM). Non-volatile computer-readable media includes, for example, read only memory (ROM), magnetic media such as a hard-disk, an optical disk drive and corresponding optical media, flash memory devices, a CD-ROM drive and corresponding media, and/or the like. In some cases, a particular memory is separated virtually or physically into separate areas, such as a first memory, a second memory, a third memory, etc. In these cases, it is understood that the different divisions of memory may be in different devices or embodied in a single memory.

As used herein, a "bus," "communication bus," "system bus," and the like provides connectivity between the components of a computing device. A computing device may be a mobile device 40a, a portable computer 42, a computer 40c, a receiving device 48, and other computing apparatus. The bus includes any known signal communication architectures. In alternative embodiments of the computing device, the components may be communicatively coupled in a different manner than illustrated in the figures. For example, one or more of the components may be directly coupled to other components, or may be coupled to each other via intermediary components. In some embodiments, the bus may be omitted and the components may be coupled directly to each other using suitable connections.

From the foregoing it will be appreciated that, although specific embodiments of the invention have been described herein for purposes of illustration, various modifications may be made without deviating from the spirit and scope of the invention. The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computing server system, comprising:
   a web server configured to:
      present a web page to a user, the web page being dynamically generated to present information corresponding to a digital video recorder associated with the user,
      accept input information from the user to control the digital video recorder, and
      communicate the input information;
   a delayed-job server configured to:
      accept the input information from the web server,
      store a job entry corresponding to the input information in a message queue,
      process the job entry from the message queue,
      create a function request representative of the input information,
      receive a response to the function request, and
      communicate data from the function request response to the web server, the web server not being blocked while waiting for the function request response from the delayed-job server; and
   an access server configured to:
      accept the function request from the delayed-job server,
      bi-directionally communicate messages with the digital video recorder, and communicate the response to the function request to the delayed-job server.

2. The computing server system of claim 1, comprising:
a data repository associated with the delayed-job server, the data repository configured to store information from the function request response and a timestamp, wherein the delayed-job server provides the data from the function request response to the web server, based on the timestamp, without creating a corresponding second function request.

3. The computing server system of claim 1 wherein the delayed-job server and the access server share computing resources.

4. The computing server system of claim 1 wherein the delayed-job server is configured from a plurality of networked computing servers.

5. The computing server system of claim 1 wherein the bi-directionally communicated messages are arranged to request:
information representative of programs currently recorded on the digital video recorder,
information representative of timers programmed on the digital video recorder,
information representative of premium programs accessible by the digital video recorder, or
information representative of program channels accessible by the digital video recorder.

6. The computing server system of claim 1 wherein the bi-directionally communicated messages are arranged to request:
information representative of programs currently recorded on the digital video recorder,
information representative of timers programmed on the digital video recorder,
information representative of premium programs accessible by the digital video recorder, and
information representative of program channels accessible by the digital video recorder.

7. The computing server system of claim 1 wherein at least one of the bi-directionally communicated messages includes a command to the digital video recorder to record a user-selected program.

8. A method, comprising:
dynamically generating a first web page with a web server including information corresponding to a certain digital video recorder;
presenting the first web page to a certain computing device;
accepting control information from the certain computing device, the control information associated with the certain digital video recorder;
communicating the control information to a delayed-job server wherein a job entry corresponding to the control information is stored in a message queue, a function request representative of the control information is created, the function request is communicated to the digital video recorder, and response data from the digital video recorder is communicated back to the web server as a function request response, the response data being associated with the control information;
waiting without blocking for the function request response from the delayed-job server;
receiving the function request response;
dynamically generating a second web page with the web server including information from the received function request response;
presenting the second web page to the certain computing device.

9. The method of claim 8 wherein the act of dynamically generating the second web page is performed by updating information presented in the first web page.

10. The method of claim 8 wherein the certain digital video recorder is associated with a first user first user and the certain computing device is associated with a second user, the first user different from the second user.

11. The method of claim 8 wherein the act of presenting the first web page to the certain computing device is performed by presenting the first web page to a certain mobile computing device.

12. The method of claim 8 wherein the act of dynamically generating the first web page with the web server and an act of storing a job entry corresponding to the control information in a message queue are performed by a same set of computing resources.

13. A method of claim 8, comprising:
sharing a same set of computing resources to carry out acts of the web server and acts of the delayed-job server.

14. A method of claim 8, comprising:
retrieving from the certain digital video recorder time-related functions stored in a memory associated with the certain digital video recorder; and
updating the first web page with the web server, the updating including presenting on the first web page at least some information representing the time-related functions stored in the memory associated with the certain digital video recorder.

15. A method of claim 8, comprising:
receiving a first indication that an operation associated with the certain digital video recorder has been completed, the operation having been requested as at least part of the control information; and
updating the first web page with the web server, the updating including presenting through the first web page a second indication that the operation associated with the certain digital video recorder has been completed.

16. The method of claim 8 wherein the act of accepting control information from the certain computing device includes accepting an input request to command the digital video recorder to record a program at a determined time, and the act of updating the first web page with the web server includes directing configuration of a display, directing configuration of an illumination output, directing configuration of an audio device, or directing configuration of a vibrating device.

17. A non-transitory computer-readable medium having a program to perform actions on a web server by performing a method comprising:
presenting a web page configured for display on a mobile device, the web page dynamically generated to present information corresponding to a certain receiving device;
accepting a control request from the mobile device directed to the certain receiving device;
identifying the certain receiving device based on information in the control request;
storing a job entry in a message queue, the job entry corresponding to the control request;
generating a function request corresponding to the job entry;
communicating the function request to a receiving device system, the receiving device system configured to solicit operational information from the certain receiving device, retrieve from the certain receiving device time-related functions stored in a memory associated with the certain receiving device, and program the certain receiving device according to the function request;

receiving a response from the receiving device system;

storing a record associated with the response;

time-stamping the record associated with the response from the receiving device system; and updating the web page with information from the time-stamped record; and presenting the updated web page configured for display on the mobile device.

18. The non-transitory computer-readable medium of claim 17, the method comprising:

assessing a charge to an account associated with the certain receiving device;

further updating the web page with information associated with the assessed charge; and presenting the further updated web page configured for display on the mobile device.

19. The non-transitory computer-readable medium of claim 17, the method comprising:

accessing a plurality of networked computing servers to perform at least some acts of the method.

20. The non-transitory computer-readable medium of claim 17 having the program to perform actions on the web server by performing the method, wherein the control request from the mobile device includes a command to the certain receiving device to record a user-selected program.

* * * * *